(12) United States Patent
Meding et al.

(10) Patent No.: US 6,684,224 B2
(45) Date of Patent: Jan. 27, 2004

(54) REMOTE DATABASE UPDATE METHOD AND APPARATUS

(75) Inventors: Uwe Meding, Allen, TX (US); Salil Gaitonde, Dallas, TX (US)

(73) Assignee: ChipData, Inc., Richardson, TX (US)

( * ) Notice: Subject to any disclaimer, the term of this patent is extended or adjusted under 35 U.S.C. 154(b) by 299 days.

(21) Appl. No.: 09/760,976

(22) Filed: Jan. 16, 2001

(65) Prior Publication Data

US 2002/0095413 A1 Jul. 18, 2002

(51) Int. Cl.7 .............................................. G06F 17/30
(52) U.S. Cl. ............................. 707/201; 707/9; 707/10; 709/218
(58) Field of Search ................................. 707/201, 203, 707/9, 10, 101, 102, 103 R, 202, 204; 709/217, 218

(56) References Cited

U.S. PATENT DOCUMENTS

| | | | | |
|---|---|---|---|---|
| 5,261,094 A | * | 11/1993 | Everson et al. | 707/201 |
| 5,649,185 A | * | 7/1997 | Antognini et al. | 707/9 |
| 5,678,041 A | * | 10/1997 | Baker et al. | 707/9 |
| 5,745,903 A | * | 4/1998 | Huan | 707/201 |
| 5,758,355 A | * | 5/1998 | Buchanan | 707/201 |
| 5,799,147 A | * | 8/1998 | Shannon | 714/6 |
| 5,829,001 A | * | 10/1998 | Li et al. | 707/10 |
| 5,878,434 A | * | 3/1999 | Draper et al. | 707/202 |
| 5,915,253 A | * | 6/1999 | Christiansen | 707/103 R |
| 5,920,867 A | * | 7/1999 | Van Huben et al. | 707/101 |
| 5,924,094 A | * | 7/1999 | Sutter | 707/10 |
| 5,940,807 A | * | 8/1999 | Purcell | 705/26 |
| 5,978,828 A | * | 11/1999 | Greer et al. | 707/10 |
| 6,125,388 A | * | 9/2000 | Reisman | 709/218 |
| 6,173,316 B1 | * | 1/2001 | De Boor et al. | 709/218 |

* cited by examiner

Primary Examiner—Shahid Alam
(74) Attorney, Agent, or Firm—Carr LLP

(57) ABSTRACT

Disclosed is an apparatus and method for selectively supplying the latest versions of portions of a source database to each of a plurality of uniquely identifiable target entities where some target entities may have access to portions completely different from those portions to which other target entities are entitled to receive. The data receiving target entity provides an indication of the time stamp and revision indications of all material presently available to the receiving entity along with the unique identifier of the receiving entity. The source returns a table of all material that a requesting entity is entitled to access along with an indication of data that has changed since the last update for the requesting entity. The requesting entity then selects from the table the desired data items to be received and obtains same from the source database.

12 Claims, 3 Drawing Sheets

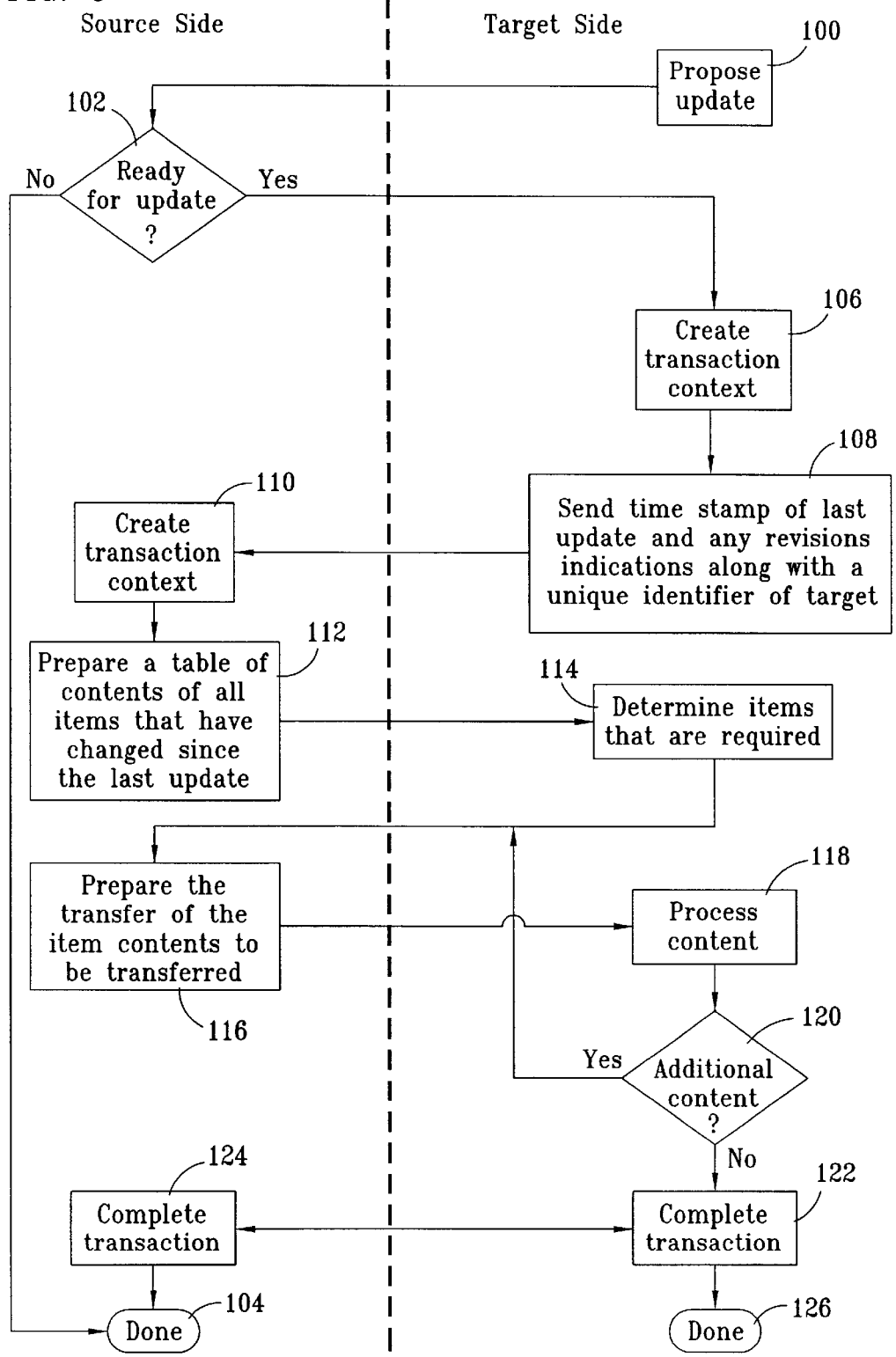

REMOTE DATABASE UPDATE METHOD AND APPARATUS

TECHNICAL FIELD

The present invention relates in general to an up-dating source database, accessible by a uniquely identified target entity, to only a portion of the total data contained in the source database where that portion comprising the data to which the target database is entitled is predetermined in conjunction with the source database.

BACKGROUND

There are numerous situations where it may be desirable for a first company, or other entity, to provide product related data to one or more second entities that may wish to use the data to build products that support or interact with products produced by the first company. For the purposes of this invention, the term "entity" may be applied to a person, group of persons, a company or portion of that company (e.g., a department or division), as well as a group of companies and the like, including one or more devices or nodes used by such persons, groups, companies or portions of them. Some of the data related to a product may be considered proprietary by the first company and thus it may be that the first company would not want it released to the public in general. This is especially true when the product is still in the design or testing stages and may still be subject to changes before being finalized. When such data is released to other companies or individuals, the entity receiving such information is generally required to sign a non-disclosure agreement with certain penalties for failing to abide by the agreement. Since different entities receiving the data typically have different products, their data requirements differ. In other words, one company receiving data related to the first company's product may have a need for only a small portion of the total database maintained by the first company, while another company may need a significant portion of the data maintained by the first company. In such instances, the scope of the non-disclosure agreements and the penalties involved may vary significantly between receiving entities.

As an example of the above, a first company "I" that produces computer chips might need significant portions of a given software product database from a second company "M" that provides computer operating systems to properly design and test computer chips designed to run on future company "M" software. A small game software company may, however, only need data related to one aspect of that same software product. It may also be noted here that company "M" may need to receive certain parts of any computer chip database maintained by company "I" to properly complete the design and testing of the given software product. In other words, two different entities may each require certain portions of each other's databases. However, each of the source data entities may well want to restrict access of the total database to only entities within the company, while allowing only specifically designated portions of the total source database to entities outside the company. Even within a company, it may be desirable to restrict access interdepartmentally or between divisions on a need-to-know basis.

Another consideration to be taken into account, before distributing data, is that the total source database may be very extensive and, likewise, the portion of that database that a given receiving entity may be entitled to access may be very voluminous. In such a case, if all the data were supplied at one time, the receiving entity might be overwhelmed. On the other hand, numerous requests, by the receiving entity, for small amounts of information would be burdensome to the source entity.

As will be realized, the source database, in the situation involving a product which is being designed, tested and redesigned to fix problems detected during testing, is continually changing recorded values and parameters and typically growing in size as more data is established and/or recorded. Thus, any party that is working on a related product needs the latest data available to make appropriate design decisions. All known prior art attempts to rely on the source of data to timely provide appropriate portions of a source database available to an entitled receiving party have failed to satisfy the receiving party.

It would thus be desirable to establish a method and service wherein an entity could provide for the distribution of any portion of data from a total source database to a plurality of requesting entities where each of the requesting entities may be restricted to different portions of the total database and the requesting entities may be physically located remotely from the source database. It would further be desirable that the portion restrictions for a given receiving entity be dynamically alterable under appropriate authority conditions from locations remote from the source database.

SUMMARY OF THE INVENTION

The present invention involves using a communication network interconnecting a source computer or other control entity associated with a source database and one or more uniquely identifiable target computers or control entities to allow each of the target entities to obtain a listing of data which they are allowed or entitled to receive and then supplying to the target entities the data selected by the target entity from the list.

BRIEF DESCRIPTION OF THE DRAWINGS

For a more complete understanding of the present invention, and its advantages, reference will now be made in the following Detailed Description to the accompanying drawings, in which:

FIG. 3 presents a flow diagram of the actions of source and target computers when the target entity initiates the transfer or updating of data in the target entity's database.

DETAILED DESCRIPTION

Figure 1:
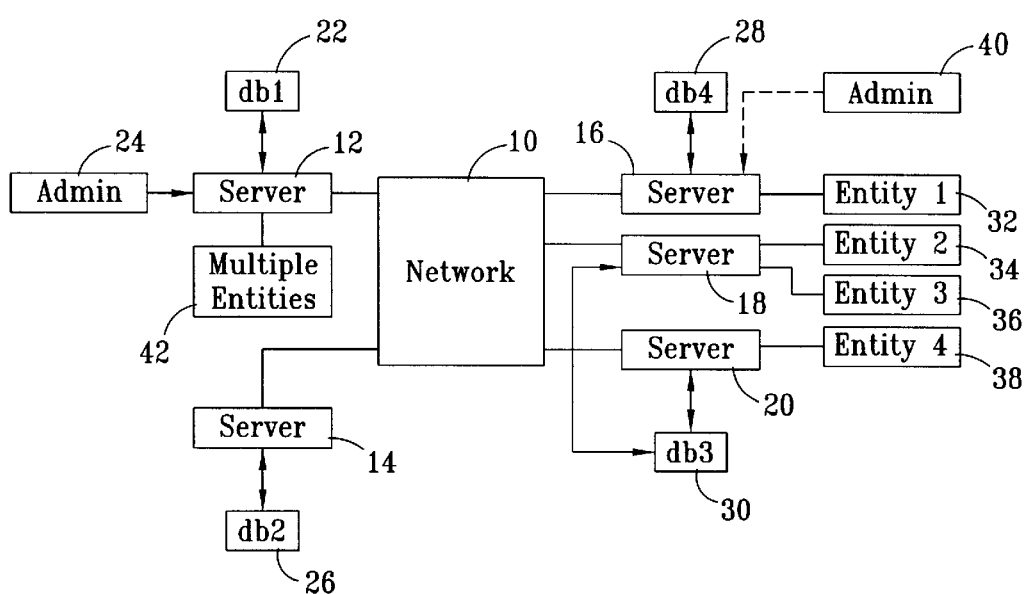
FIG. 1 is a block diagram of a system incorporating a network for practicing the present invention.

In FIG. 1, a network 10 interconnects a plurality of servers, computers or similarly responding control mechanisms 12, 14, 16, 18, and 20. The server 12 is shown connected to a first database 22 and further may be controlled by an administrator input designated as block 24. A database 26 is interconnected to server 14. For the purposes of the present invention, the servers 12 and 14 and their associated databases 22 and 26 may be considered to be a part of the source data entity.

Also shown in FIG. 1 is a database 28 associated with server 16 and a further database 30 associated with both servers 18 and 20. A database user, labeled entity 1, is designated as 32, while further users entity 2, entity 3 and entity 4 are respectively assigned designators 34, 36 and 38. A dash line connects an optional administrator block 40 to server 16. A plurality of entities is given a designator of block 42. These entities 42 are assumed to be working for the company that has established the database 22. Some of the plurality of entities 42 may have data access rights differing from other entities within the company. An example of differing rights would be that some employees may be allowed access to tools which may be used to change data within the database 22, while others may only be allowed to peruse the data. Even among those allowed to change data, some may be restricted to which types of data within database 22 they are allowed to change.

While three servers, two databases and four remote target entities are illustrated in the drawing, for receiving data from one or both of the databases 22 and 26, any number of additional target entities could be connected to receive uniquely styled data updates from the source database(s). Further, the dash line administrator block 40 is provided to illustrate that the present invention allows the administrator to modify the source database target limitations relative to the types of data a given target entity is entitled to receive from a location remote from the data source. The remote location may be designed or constructed to include a target server location where the software incorporated therein is designed to accommodate instructions from an administrator entity.

In the system illustrated in FIG. 1, any server may communicate with any other server. Further, within restrictions set up by an administrator, any given server may be able to access some portion of the data contained in a database other than the one shown directly associated with and connected to that server. The administrator, such as 24 (and possibly 40) may assign, or cause to be assigned, unique identification labels or names to be used by any entity wishing to retrieve data from database 22. When data is requested from a data source, represented by block 22, by an entity, such as block 32, the request will also include a listing of the items of the type requested that the entity already has stored in a database, such as 28, along with any revision or timestamp indications included with that data. The server 12 will check a database to see what types of data entity 32 is entitled to receive. It will then assemble a table of contents of items that are not on the list of items that the requesting entity already has received. The contents table being assembled will also include more recent versions (dated revisions) of outdated data presently contained in the requestor's database. When the requesting entity, such as 32, receives the table, a selection of desired data is assembled and returned to the source server, such as 12. The requested data is sent in one or more batches to the entity 32. As each selected item is satisfactorily received by the server 16 associated with entity 32, such receipt is noted in a transaction context database maintained by the receiving server 16. When all requested items have been satisfactorily received by entity 32, the server 12 is so notified and upon acknowledgement by server 12, the process is deemed complete by both the source and target servers 12 and 16.

As will be apparent, if the resources available to each of the servers is adequate, multiple requests and data transfers may be occurring simultaneously.

As shown, the database 30 is utilized by two servers, as well as by each of the requesting entities 34, 36 and 38. However, the software within each server may store each requesting entity's data in a different storage area to accomplish security requirements.

Alternatively, all of the data may be contained in a common storage location within database 30. In such a situation, the server 18 may use well known security procedures, including the requesting entity's unique identifier and a list of items that have been successfully requested by a given entity, to prevent a given requesting entity, such as 34, from accessing some of the data, contained in the database 30, to which only other entities, such as 36, may be entitled to access. Security measures that may be incorporated in the software may include public-key infrastructures (PKI) and/or secure socket layer (SSL) transfers.

Figure 2:
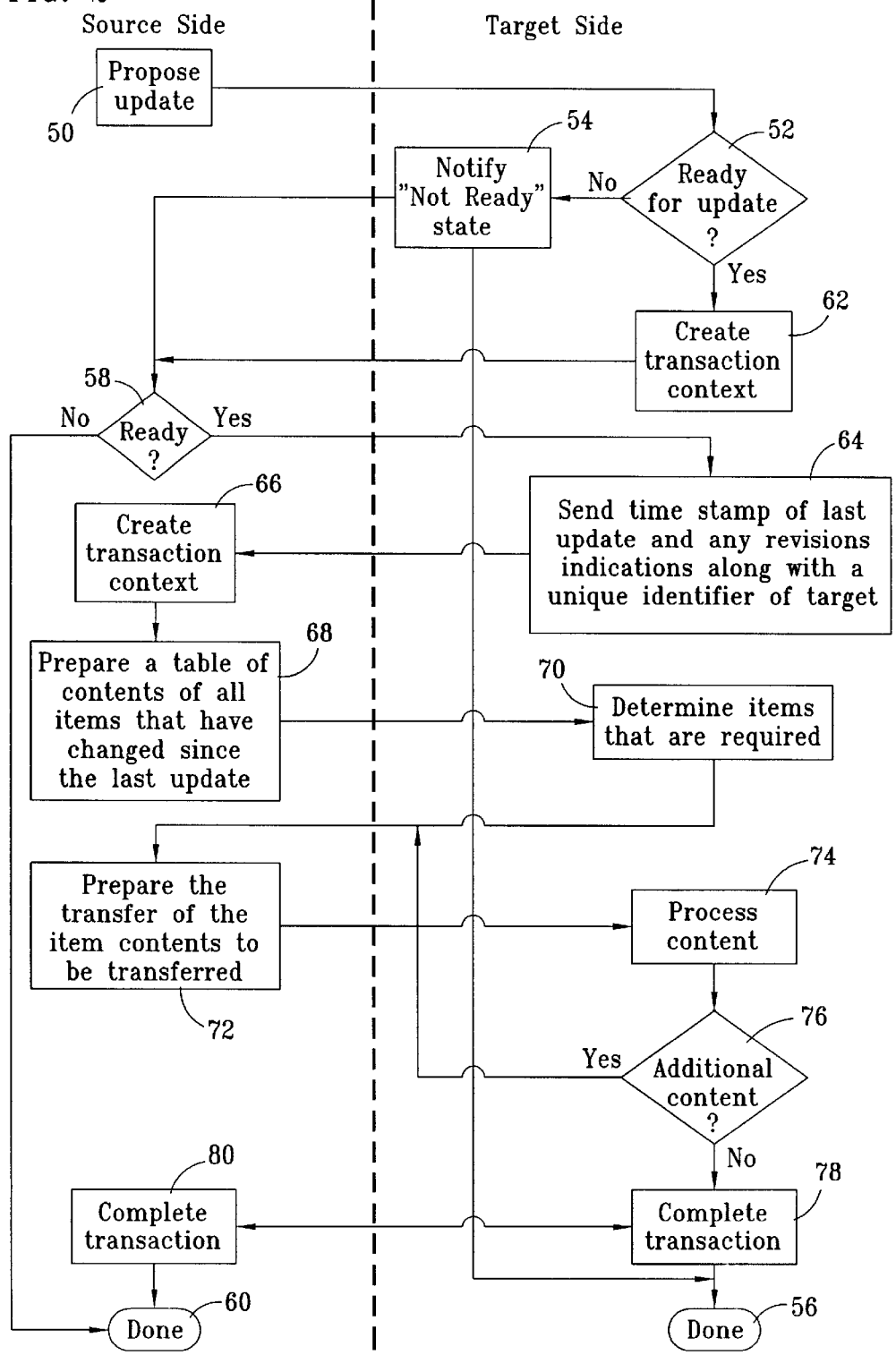
FIG. 2 presents a flow diagram of the actions of source and target computers when the source data entity initiates the transfer or updating of data in the target entity's database.

As previously indicated, in FIG. 2, the flow diagram illustrates the actions taken by both the source and target servers when the source server initiates an update of a given target entity. The procedure starts with block 50 where a server, such as 12, proposes to a target entity, such as 38, that an update be delivered by sending a message to server 20.

Such an action may well be taken where the source database has been significantly expanded in an area where it is known that a given target entity requires the most recent revision of data. Thus, the administrator 24 may be instructed to institute such an exchange of data.

Server 20 checks to determine whether or not it presently has the computing and/or storage capacity to receive an update. The server may also check to determine whether or not entity 38 is presently logged in so that a selection may be made of data to be updated before accepting such a proposal for update. If the server 20 is not ready to receive data, this determination is used in a block 54 to proceed to a DONE block 56 within the program of server 20, and a message is returned to server 12 via a "READY?" block 58 to end the procedure by advancing to a DONE block 60. The program within server 12 may include a procedure to re-propose the update a given number of times in the future when such a "not ready" message is received from a proposed target update entity.

Alternatively, the server for the target entity may, as part of the action in block 54, take action, when the target server has the required capability to receive update data and the target entity 38 is accessing the server, to request an update along the lines of the procedure presented in FIG. 3. In such a situation, the update proposed in block 50 would require some identifying data specifying the updated data to be transmitted.

In the normal situation where the receiving server 20 is ready for or able to receive an update, the flow of action proceeds from block 52 to a create transaction context block 62.

The transaction context block creates a boundary around a group of operations on (distributed) resources and is treated as a unit of work. In this unit of work, all the participating operations will either succeed or fail and recover together. The transaction context boundary (or as more typically used by those skilled in the art "transaction context") is thus used to ensure the entities involved that all of the requested data has been both transmitted and accurately received by the requesting entity. Once the transaction context boundary is created, the source server 12 is notified that the server 20 is ready to receive data. If it is determined that the data can be accurately received, the database is returned to its original condition. If, on the other hand, it is determined that the data has been accurately received, the transaction context boundary is removed and the recently updated data is then accessible by others.

The block 58 then returns a message to server 20 whereby, in block 64, data is assembled including a time stamp of the last update for each item previously requested by entity 4 of block 38, along with any revisions indications relevant to the stored item. The unique identifier of target entity 38 would also be included in the data assembled to assure the source server 12 that the correct security procedures were being maintained for entity 38.

Upon receipt of the assembled message by server 12, a server initiated transaction context boundary is created, as shown by block 66. The server 12 then prepares a table of contents of all items that the target entity 38 does not presently have and to which he is presently entitled and includes an indication of all items that have changed since the last update of a given item, as set forth in a block 68. When this table of contents is received by the server 20, the entity 38 selects the items he wants or requires, as set forth in a block 70, and returns the resulting selection list to server 12. Upon receipt of the returned selection list, the server 12 prepares for transfer of the selected data, as set forth in a block 72. The data returned may be contained in a multiplicity of data blocks due to network or server constraints. The data supplied to the target server 20 is processed, as set forth in a block 74. As each block of data is completed, a check is made, as shown by a block 76, as to whether or not more data needs to be received to complete the list of requested data items. If more data needs to be forthcoming, a message is returned via a YES output of block 76 to the server 12. When the server 20 determines that all requested data has been received, the program proceeds to a block 78, where the server 12 is notified that the server 20 believes that the transaction is complete. If the server 12 agrees, a message is returned to server 20 acknowledging receipt of the transaction complete message, as shown by block 80. At this time, both servers 12 and 20 proceed to their respective DONE blocks 60 and 56, respectively.

In FIG. 3, the flow diagram illustrates the actions taken by both the source and target servers when the target server initiates an update of a given target entity's data. The procedure starts with block 100 where a server, such as 20, proposes to a source entity, such as database 22, that an update be provided by sending a message to server 12.

Server 12 checks to determine whether or not it presently has the computing and/or storage capacity to accommodate the transmission of an update. If not, this determination is used in a block 102 to proceed to a DONE block 104 within the program of server 12. If the server 20 does not receive a ready for update reply message from the server 12 within a given time, it can either retransmit the request a given number of additional later occurring times, or it can terminate the request process as determined by the requirement of the requesting entity, such as block 38 (entity 4).

In the normal situation where the source server 12 is ready for or able to supply an update, the flow of action proceeds from block 102 to a block 106 in the target server 20 to a create transaction context boundary. The transaction context block 106 causes the creation of an operational or database boundary which is used to track receipt of data in the same manner as discussed in connection with FIG. 2. Once the transaction context boundary is created, data is assembled, as set forth in a block 108, including a time stamp of the last update for each item requested by entity 4 of block 38, along with any revisions indications relevant to the stored item. The unique identifier of target entity 38 is also included in the data assembled so that the source server 12 may check which data items the requesting entity is entitled to receive.

Upon receipt of the assembled message by server 12, a source server initiated transaction context boundary is created, as shown by block 110. The server 12 then prepares a table of contents of all items that the target entity 38 does not presently have and to which the requesting entity is presently entitled, and includes an indication of all items that have changed since the last update of a given item, as set forth in a block 112. When this table of contents is received by the server 20, the entity 38 selects the items wanted or required, as set forth in a block 114, and returns the resulting selection list to server 12. Upon receipt of the returned selection list, the server 12 prepares for transfer of the selected data, as set forth in a block 116. The data returned may be contained in a multiplicity of data blocks due to network or server constraints. The data supplied to the target server 20 is processed, as set forth in a block 118. As each block of data is completed, a check is made, as shown by a block 120, as to whether or not more data needs to be received to complete the list of requested data items. If more data needs to be forthcoming, a message is returned via the "YES" output of block 120 to the server 12. When the server 20 determines that all requested data has been received, the program proceeds to a block 122, where the server 12 is notified that the server 20 believes that the transaction is complete. If the server 12 agrees, a message is returned to server 20 acknowledging receipt of the transaction complete message, as shown by a block 124. At this time, both servers 12 and 20 proceed to their respective "DONE" blocks 104 and 126.

From the above, it may be determined that the present invention may be used to interchange data on a selective and restrictive basis in both directions between entities connected to the network. The network used in the invention may be private or may be a public network, such as the Internet or some combination of public and private networks.

Further, a given server and associated database may be a target for restricted data received from some other entity, while also being a source of restricted data to be supplied to any one or more of the network connected entities.

Thus, a given database, such as 22, may not only comprise data to be distributed to others on a predetermined basis, but may also include restricted data received from other entities that is to be selectively provided to a number of entities (not specifically shown in FIG. 1) connected to server 12. Further, the database 22 will typically include at least a database of all uniquely identified entities entitled to receive data and which types of data each of those uniquely identified entities are entitled to receive.

The invention as presented herein further includes the capability of changing the restrictions as to the types of data a given entity or groups of entities are entitled to receive from a location remote from the source database. Thus, a member of a team of individuals involved in assembling the source database 22 may, while visiting a remotely located entity using some data from the source database, determine that the remotely located entity requires resource data not previously available to that entity. With proper security provisions, the member may, as shown by dash line administrator block 40 in FIG. 1, cause a modification of the restrictions within the database of block 22, such that the remotely located entity may request an update and quickly obtain all the latest data relevant to his requirements.

Since the server 14 and the database 26 were previously indicated as being part of the source data entity, it will be apparent that some of the source data may be stored in database 26 and may be transferred via instructions from either server 12 or server 14. Further, with appropriate software, the transfer of data from database 26 may be controlled in accordance with specifications maintained by server 12 and modified by administrator 24.

It should be noted that, as set forth in the background, an entity may, depending upon circumstances, cover a variety of objects. As an example, a computer may be set up such that each person "logging on" has access to different parts or portions of the computer memory. In such a situation, each person logging on may be properly termed an entity that may receive different quantities or types of data. As a further example, in a different environment, access to the computer may be limited to only those people authorized to view the same type of data and, in this situation, either the device itself or the group of people having access may properly be termed the defined entity.

Although the invention has been described with reference to a specific embodiment, these descriptions are not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A method of managing data distribution of selected portions of data from a source server database over a network to a remote entity target database, comprising the steps of:

assigning a unique identifier to a remote target entity;

receiving an update request from the remote target entity at said source server;

sending a first source server message from said source server to said target entity indicating all items that have changed since the last previous update for said target that the target is entitled to receive;

defining selected types of data to be accessible in conjunction with said unique identifier; and granting download of data selected from the first source server message by the remote target entity, conforming to the unique identifier defined types of data, upon request by said remote entity.

2. The method of claim 1 wherein the granting of download of data from a source server associated with said source database to a remote entity target includes the steps of:

returning an acknowledgement message from said source server to said target when the source server is ready to provide an update;

creating a transaction context in a storage location of said target;

sending a first target message from said target to said source server indicating the time of occurrence of last previous update at said target;

creating a transaction context in a storage location of said source server upon receipt of the response message from said target;

returning a second target message, from said target to said source server, detailing the items required from said source server as selected from said first source server message;

sending the items, as part of a second source server message and as requested in said second target message, from said source server to said target;

checking the data received by said target as part of said second source server message to determine if all requested data has been received;

notifying said source server to supply any remaining requested data if the checking by said target determines any deficiency;

sending a third target message from said target to said source server when said target deems that the transaction is complete; and returning an acknowledgement third source server message to said target that the source server has received the transaction complete third target message.

3. A method of managing data distribution of selected portions of data from a source server database over a network to a remote entity target database, comprising the steps of:

assigning a unique identifier to a remote entity;

defining selected types of data to be accessible in conjunction with said unique identifier;

receiving an update request at the said source server from the remote target entity;

sending a first source message from said source server to said target entity indicating all items that have changed since last previous update for said target that said target is entitled to receive; and downloading specified data selected by the target entity, conforming to the unique identifier defined types of data available to be downloaded, upon request by said remote entity target.

4. The method of claim 3 wherein the downloading of data from a source server associated with said source database to a remote entity target includes the steps of:

returning an acknowledgement message from said target to said source server when the target is ready to receive an update;

creating a transaction context at said target;

sending a first target message from said target to said source server indicating the time of occurrence of last previous update at said target;

creating a transaction context at said source server upon receipt of the response message from said target;

returning a second target message, from said target to said source server, detailing the items required from said source server as selected from said first source server message;

sending the items, as part of a second source server message and as requested in said second target message, from said source server to said target;

sending a third target message from said target to said source server when said target deems that the transaction is complete; and returning an acknowledgement third source server message to said target that the source server has received the transaction complete third target message.

5. A method of selectively supplying updating data from a source database to one of a plurality of remotely located target databases, comprising the steps of:

assigning unique identifiers to each of said plurality of target databases;

associating each of said unique identifiers with selected items of said source database in accordance with predetermined criteria;

determining which database items, contained in the source database, have changed since the last update of the database at a given target of those database items that a given target database is entitled to receive as ascertained in accordance with said predetermined criteria;

transmitting a list of database items, from the source database to a control mechanism associated with said target database, that may be supplied from said source database to update said target database;

returning a selected itemization message, from the control mechanism associated with said target database to the control mechanism associated with said source database, requesting the selected items;

supplying the selected items from said source database to said target database; and notifying the control mechanism associated with said source database when the control mechanism associated with said target database determines that all requested data has been satisfactorily received.

6. The method of claim 5 wherein either one of the control mechanisms associated with the source and target databases may initiate the target database updating procedure.

7. The method of claim 5 wherein the control mechanism associated with the target database supplies the unique identifier applied to the target database to be updated as part of one of the communications with the source database control mechanism before any of the selected items are supplied to the target database.

8. A server system, comprising:

a source database from which predetermined data items may be selected to update each of a plurality of uniquely identifiable target databases;

source computer means associated with said source database;

means for creating a temporary transaction context upon receipt of information from a computer associated with a target database indicating the date of the last update to said target database;

means for preparing a table of contents of all items, to which that uniquely identifiable target database is entitled to receive, that have changed since the last update of said target database occurred;

means for supplying said table of contents to the computer associated with the target database;

means for receiving, from the computer associated with the target database, a list of items to be transferred to said target database as selected from the table of contents supplied to the computer associated with the target database;

means for supplying the selected list of items to the computer associated with the target database; and means for receiving and acknowledging a transaction complete message from the computer associated with the target database.

9. A server system, comprising:

a uniquely identified target database that may need periodic updates from a source database where the target database is only permitted to receive predetermined items from the source database;

target computer means associated with said target database;

means for creating a temporary transaction context upon determination that both the target computer and a source computer associated with said source database are ready to attempt the completion of an updating procedure;

means for supplying to the source computer associated with said source database information indicating the date of the last update to said target database;

means for receiving a table of contents, from the source computer associated with said source database, of all items, to which that uniquely identifiable target database is entitled to receive, that have changed since the last update of said target database occurred;

means for providing a list of items to be transferred to said target database, as selected from the table of contents, to the source computer associated with said source database;

means for receiving the selected list of items from the source computer associated with said source database; and means for supplying to and acknowledging a transaction complete message from the computer associated with the source database.

10. Database updating apparatus, comprising:

source database;

source control associated with said source database;

target control apparatus including a target database and a uniquely identifiable target entity;

means for communicating between said source and target controls;

specification means, associated with said source control and source database, for defining the access limitations for each uniquely identifiable target entity entitled to access the source database;

means, associated with said target control apparatus, for requesting data from said source database for a given uniquely identifiable target entity;

means, associated with said source control, for supplying a table of data to which the requesting uniquely identifiable target entity is entitled to receive;

means, associated with said target control, for returning a list of items, selected from said table, to said source control; and means, associated with said source control, for transferring the latest version of the selected data from said source database to said target control.

11. Database updating apparatus, comprising:

source database;

source control associated with said source database;

means for communicating between said source and target entities;

specification means, associated with said source control and source database, for defining the access limitations for each uniquely identifiable target entity entitled to access the source database;

means, associated with said source control, for supplying a table of data to which the requesting uniquely identifiable target entity is entitled to receive; and means, associated with said source control, for transferring the latest version of data selected by the target entity from the table of data to the target entity.

12. Database updating apparatus, comprising:

target control apparatus including a target database and a uniquely identifiable target entity;

means for communicating with a limited access source database;

means, associated with said target control apparatus, for requesting up-to-date data from the limited access source database for a given uniquely identifiable target entity;

means, associated with said target control, for returning a list of items, selected from a table of data obtained from the source database and which table is limited to only data to which the target entity is entitled to access, to said source control; and means, associated with said target control, for storing the latest version of the selected data received from said source database.

* * * * *